US007822492B2

(12) United States Patent
De Benedetto et al.

(10) Patent No.: US 7,822,492 B2
(45) Date of Patent: Oct. 26, 2010

(54) METHODS AND SYSTEMS FOR OPERATING AN AUTOMATED SYSTEM USING A PROCESS DEFINITION MODEL

(75) Inventors: David De Benedetto, Edmonton (CA); Ryan Berry, Edmonton (CA); Javan Gargus, Edmonton (CA); Gregory Millinger, Port Clinton, OH (US)

(73) Assignee: GE Intelligent Platforms, Charlottesville, VA (US)

( * ) Notice: Subject to any disclaimer, the term of this patent is extended or adjusted under 35 U.S.C. 154(b) by 472 days.

(21) Appl. No.: 11/875,236

(22) Filed: Oct. 19, 2007

(65) Prior Publication Data

US 2009/0105851 A1    Apr. 23, 2009

(51) Int. Cl.
 *G06F 19/00* (2006.01)
(52) U.S. Cl. .............................. 700/29; 700/23; 700/27; 700/89
(58) Field of Classification Search .................... 700/29, 700/23, 27
 See application file for complete search history.

(56) References Cited

U.S. PATENT DOCUMENTS

| | | | |
|---|---|---|---|
| 3,828,321 A | 8/1974 | Wilber et al. | |
| 4,377,000 A | 3/1983 | Staab | |
| 4,654,821 A | 3/1987 | Lapp | |
| 4,912,708 A | 3/1990 | Wendt | |
| 5,580,366 A | 12/1996 | Farkas et al. | |
| 5,655,083 A | 8/1997 | Bagley | |
| RE37,038 E | 1/2001 | Eastridge et al. | |
| 6,339,832 B1 * | 1/2002 | Bowman-Amuah | 714/35 |
| 6,351,824 B1 | 2/2002 | Singh | |
| 6,356,806 B1 | 3/2002 | Grob et al. | |
| 6,434,628 B1 * | 8/2002 | Bowman-Amuah | 714/48 |
| 6,449,618 B1 * | 9/2002 | Blott et al. | 1/1 |
| 6,496,831 B1 * | 12/2002 | Baulier et al. | 1/1 |
| 6,496,850 B1 * | 12/2002 | Bowman-Amuah | 709/203 |
| 6,502,133 B1 * | 12/2002 | Baulier et al. | 709/224 |
| 6,681,230 B1 * | 1/2004 | Blott et al. | 1/1 |

(Continued)

FOREIGN PATENT DOCUMENTS

EP    1672451 A    6/2006

(Continued)

OTHER PUBLICATIONS

"Flexible Exception Handling in the OPERA Process Support System", Hagen et al, Swiss Federal Institute of Technology (ETH), 1998.*

(Continued)

*Primary Examiner*—Michael D Masinick
(74) *Attorney, Agent, or Firm*—Global Patent Operation; Mark A. Conklin (57) ABSTRACT

A method is provided for operating an automated process defined by an execution model. The automated process includes a plurality of sub-processes. The method includes detecting an event during a first sub-process of the plurality of sub-processes, and resetting the first sub-process by operating an unload procedure that is written into the execution model. The method also includes operating at least one of a pre-process and a pre-sub-process procedure to facilitate continuing the automated process at a predetermined step of the automated process. The pre-process and the pre-sub-process procedures are written into the execution model.

20 Claims, 2 Drawing Sheets

U.S. PATENT DOCUMENTS

| | | | |
|---|---|---|---|
| 7,120,812 B2 | 10/2006 | Teradaira et al. | |
| 2004/0117371 A1* | 6/2004 | Bhide et al. | 707/9 |
| 2004/0133777 A1* | 7/2004 | Kiriansky et al. | 713/166 |
| 2004/0153199 A1 | 8/2004 | Sagasaki | |
| 2006/0155481 A1 | 7/2006 | Gikas et al. | |

FOREIGN PATENT DOCUMENTS

| | | | |
|---|---|---|---|
| WO | WO2005/061187 A | 7/2005 | |

OTHER PUBLICATIONS

"Anticipation to Enhance Flexibility of Workflow Execution", Grigori et al, DEXA 2001, LNCS 2113, pp. 264-273, 2001.*

"Implementing a Multi-Agent Systems Approach to Collaborative Autonomous Manufacturing Operations"—Jarvis et al, CSIRO Manufacturing Science and Technology, IEEE 2001.*

"Novel Methods for Decision Support in Production Planning and Control", Andras Pfeiffer, Hungarian Academy of Sciences, Budapest 2007.*

* cited by examiner

METHODS AND SYSTEMS FOR OPERATING AN AUTOMATED SYSTEM USING A PROCESS DEFINITION MODEL

BACKGROUND OF THE INVENTION

This invention relates generally to automated systems and, more particularly, to methods and systems for operating an automated system.

At least some known automated manufacturing processes execute a procedure to safely shut down the manufacturing resources associated with the process when the process is finished. For example, if a process utilizes a manufacturing line for a production run, the process must release that line upon completion. Generally, this procedure is run whether the process is completed normally, encounters an exception, or is canceled by an administrator.

Further, if a server that is running the manufacturing process is stopped, the process must be restored upon restart to continue executing the process. Ideally, the process is restored to a known state. Generally, a procedure is run to initialize the manufacturing resources associated with the process when the process is restored. Further, on occasion, some steps of a process will need to be performed again. This typically happens because a re-work of the product is necessary. In such an event, it would be beneficial to jump to a previous sub-process step. Similarly, process steps are occasionally skipped because the steps do not need to be performed or cannot be performed. In either of these scenarios, procedures may be run to clean up the possible partial execution of the current step. Moreover, some processes are executed continuously such that the process is started immediately after the previous process is completed. Accordingly, allocating resources each time the process executes may be expensive. Currently, there is no procedure to allocate these resources before executing a procedure to release the resources when the continuous process is stopped.

BRIEF DESCRIPTION OF THE INVENTION

In one aspect, a method is provided for operating an automated process defined by an execution model. The automated process includes a plurality of sub-processes. The method includes detecting an event during a first sub-process of the plurality of sub-processes, and resetting the first sub-process by operating an unload procedure that is written into the execution model. The method also includes operating at least one of a pre-process and a pre-sub-process procedure to facilitate continuing the automated process at a predetermined step of the automated process. The pre-process and the pre-sub-process procedures are written into the execution model.

In another aspect, an automated system is provided that includes automated equipment and a processor configured to operate the automated equipment. The processor operates the automated equipment by operating an automated process defined by an execution model. The automated process includes a plurality of sub-processes. The processor is also configured to detect an event during a first sub-process of the plurality of sub-processes, and reset the first sub-process by operating an unload procedure that is written into the execution model. The processor is also configured to operate at least one of a pre-process and a pre-sub-process procedure to facilitate continuing the automated process at a predetermined step of the automated process. The pre-process and the pre-sub-process procedures are written into the execution model.

In yet another aspect, a computer program embodied on a computer-readable medium is provided. The computer program includes at least one code segment that is configured to instruct a computer to operate an automated process by an execution model. The automated process includes a plurality of sub-processes. The computer is also instructed to detect an event during a first sub-process of the plurality of sub-processes, and reset the first sub-process by operating an unload procedure that is written into the execution model. The computer is also instructed to operate at least one of a pre-process and a pre-sub-process procedure to facilitate continuing the automated process at a predetermined step of the automated process. The pre-process and the pre-sub-process procedures are written into the execution model.

DETAILED DESCRIPTION OF THE INVENTION

Technical effects of the present invention include providing a formalized manufacturing process definition model that is enforced by process design software and leveraged by a process execution engine to operate an automated system. The structure of the model simplifies process design issues including, but not limited to, initialization/shutdown, process recovery, re-work/canceling of process steps, and/or re-use of logic between processes.

As described herein, a process includes a set of high-level steps called sub-processes. Each of these sub-processes is made up of lower level activities that define the behavior of the sub-process. A process may contain event procedures that are defined using the same set of activities but are invoked at various steps in the execution of the process. In the exemplary embodiment, a sub-process is re-used by multiple process definitions. In addition, process templates are defined to allow a set of event procedures to be re-used by multiple process definitions.

Although the present invention is described with respect to operating an automated system, as will be appreciated by one of ordinary skill in the art, the present invention may also apply to operating any suitable system and/or equipment. Further, although the present invention is described with respect to processors and computer programs, as will be appreciated by one of ordinary skill in the art, the present invention may also apply to any system and/or program that is capable of converting a software environment. For example, as used herein, the term processor is not limited to just those integrated circuits referred to in the art as processors, but broadly refers to computers, processors, microcontrollers, microcomputers, programmable logic controllers, application specific integrated circuits, and other programmable circuits. The processor may be part of a computer that may include a device, such as, a floppy disk drive or compact disc-read-only memory (CD-ROM) drive, for reading data from a computer-readable medium, such as a floppy disk, a CD-ROM, a magneto-optical disk (MOD), or a digital versatile disc (DVD).

Figure 1:
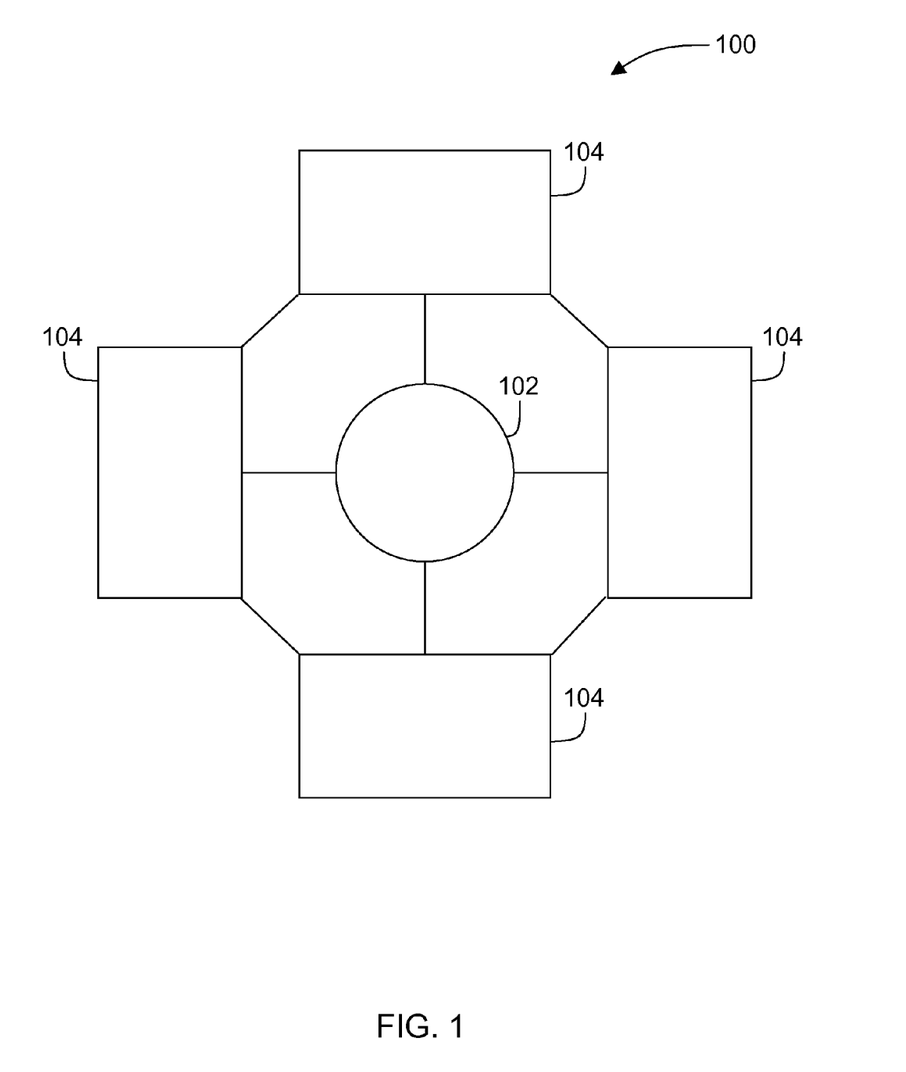
FIG. 1 is a schematic view of an automated system.

FIG. 1 is a schematic view of an automated system 100. Automated system 100 includes a processor 102 and a plurality of automated equipment 104. In one embodiment, processor 102 is utilized with a computer and/or operates software to control the automated equipment 104. In an alternative embodiment, processor 102 operates automated equipment 104 using any method and/or system that enables automated equipment 104 to operate as described herein. Further, in the exemplary embodiment, processor 102 is electronically coupled to each piece of automated equipment 104. In an alternative embodiment, processor 102 wirelessly communicates with automated equipment 104 and/or communicates with automated equipment 104 using any suitable method known in the art of automated systems.

Automated equipment 104 is configured to perform at least one manufacturing process. For example, in one embodiment, each piece of automated equipment 104 works substantially simultaneously to perform a single manufacturing process. In an alternative embodiment, the manufacturing process includes a plurality of sub-processes. Accordingly, in one embodiment, each piece of automated equipment 104 performs a separate sub-process of the process. In an alternative embodiment, one or more sub-processes are performed by a combination of the pieces of automated equipment 104.

The present invention provides a process execution model that may be used to operate automated system 100. In the exemplary embodiment, the model specifies that each process is made up of a sequence of sub-processes and each sub-process contains a set of low level activities that define the execution behavior of the sub-process. In the exemplary embodiment, a sub-process can be re-used by multiple process definitions in the system. Further, a process can be designated as continuous, such that the process is restarted each time it has completed execution.

Moreover, in the exemplary embodiment, logic for event procedures that are executed during the lifecycle of the process is defined. For example, such event procedures may include, but are not limited to, load, pre-process, pre-sub-process, post-sub-process, post-process, and/or unload. In the exemplary embodiment, a load procedure is invoked when a process is initially run and prior to executing any other procedures and/or sub-processes. Typically, the load procedure is only run once, even for a continuous process. Further, in the exemplary embodiment, a pre-process procedure is invoked at the beginning of each process loop. Generally, a non-continuous process will only execute this procedure once. Conversely, a continuous process executes this procedure each time the process is restarted. In the exemplary embodiment, the pre-sub-process procedure is invoked before each sub-process step in the process, the post-sub-process procedure is invoked after each sub-process step in the process, and the post-process procedure is invoked after executing all of the sub-processes and the associated pre/post-sub-process procedures. A non-continuous process will only execute the post-process procedure once, but a continuous process executes the procedure at the end of every process loop. Moreover, in the exemplary embodiment, the unload procedure is invoked when the process is terminated, after all procedures and sub-processes have executed. The unload procedure is only run once, even for a continuous process.

When an unhandled exception occurs during a sub-process, known process execution models terminate the entire process. However, in the exemplary embodiment, the process execution model continues to execute the post-sub-process, post-process, and unload event procedures. Further, these procedures are executed if the automated machine is manually shut down during the process. Accordingly, a process designer is enabled to write cleanup logic for any unexpected terminating process.

The state of a process is determined at the beginning of each sub-process. If the automated machine is unexpectedly shut down, the process can be resumed from the beginning of a previously executing sub-process. Resuming processes from well-defined points provide a controlled environment for a process designer. As such, the process designer does not need to account for a process resuming at a random point during the process and/or a sub-process. Further, when the process resumes, the load, pre-process, and pre-sub-process procedures are executed to allow the process designer to re-initialize any resources that may no longer be in the expected state.

The process execution model further allows an operator to jump between sub-processes in a process. When a jump operation occurs, the process engine ceases the execution of the current sub-process and runs the post-sub-process procedure as though the sub-process has been canceled, thereby, allowing any necessary cleanup. The pre-sub-process procedure then runs for the target sub-process to allow for initialization that may be required prior to transitioning to the new state. Finally, the target sub-process is executed such that the process continues normally from that point. In the exemplary embodiment, an operator can only jump to the start of a sub-process, thereby reducing the complexity of the jump operations. In an alternative embodiment, the operator can jump to any portion of the process and/or sub-process.

In one embodiment, a process template is provided to define a set of process event procedures that are used in multiple processes. The process template does not contain any sub-processes. Rather, it only contains the logic of the process events. When a process is created, the process is assigned a process template so that a process designer is not required to write logic for process events that are inherited from the template. In the exemplary embodiment, changes to the process template are automatically reflected in all processes that use the template.

Figure 2:
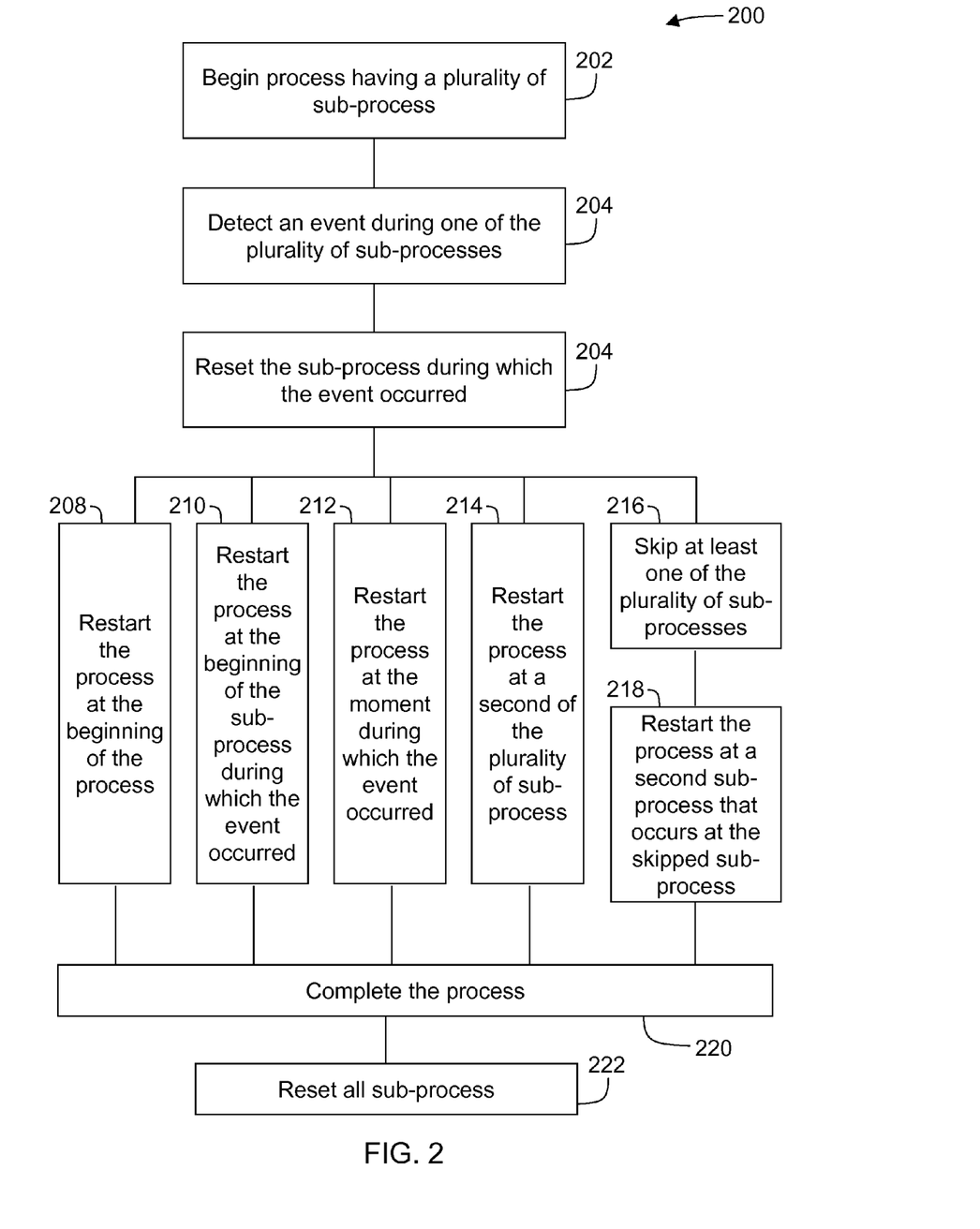
FIG. 2 is a flowchart of a method that may be used to operate the automated system shown in FIG. 1.

FIG. 2 is a flowchart of a method 200 that may be used to operate automated system 100. The method 200 includes beginning 202 a process that includes a plurality of sub-processes. In exemplary embodiment, the process is an automated process that includes a plurality of automated sub-processes. In the exemplary embodiment, the process begins with a load procedure and a pre-process procedure and each sub-process begins with a pre-sub-process procedure.

The method 200 also includes detecting 204 an event during one of the plurality of sub-processes and resetting 206 the sub-process during which the event occurred. In the exemplary embodiment, the event is an error in the process and/or a stoppage of the process. When the sub-process is reset 206 a post-sub-process procedure, a post-process procedure, and an unload procedure are run to return the sub-process and the process to a beginning position. In one embodiment, the process is reset 206 at the beginning of the process 208, at the beginning of the sub-process during which the event occurred 210, at the moment during which the event occurred 212, at a second sub-process that is different than the sub-process during which the event occurred 214, or at least one of the plurality of sub-processes is skipped 216, and the process is reset 206 at a second sub-process that occurs after the skipped sub-process 218.

The method 200 also includes completing the process 220 and restarting each sub-process 222. In the exemplary embodiment, a post-sub-process procedure, a post-process procedure, and an unload procedure are run to restart each sub-process.

Accordingly, the exemplary embodiment enables process designers to author initialization and shutdown procedures in the same graphical environment that is used for a remainder of the process definition. As such, processes inherently support jumping back and/or forward to allow for more flexibility in production, and common process procedures may be reused throughout an organization.

Further, the present invention enables process designers to define the recovery behavior of a process in the event of an unexpected system shutdown. Accordingly, changes to a process template are automatically replicated to all processes that derive from the template. In the exemplary embodiment, saving the workflow state at the start of sub-processes instead of after every activity facilitates improving process engine performance.

The process events described herein are not built into the process engines of known workflow products and, therefore, the events are not supported by the known workflow products. In these known systems, the event procedures are not capable of running when an exception occurs, for example, when the process is reloaded and/or jumps between steps. Accordingly, the procedures are copied from one process to another, thereby leading to issues in maintaining the processes. In some known systems, the process engine automatically handles initialization and shutdown, without requiring the user to write any process logic. However, due to the complexity of manufacturing environments, it is difficult and/or limiting to provide the functionality described herein.

In one embodiment, a method is provided for operating an automated process defined by an execution model. The automated process includes a plurality of sub-processes. The method includes detecting an event during a first sub-process of the plurality of sub-processes, and resetting the first sub-process by operating an unload procedure that is written into the execution model. The method also includes operating at least one of a pre-process and a pre-sub-process procedure to facilitate continuing the automated process at a predetermined step of the automated process. The pre-process and the pre-sub-process procedures are written into the execution model.

In one embodiment, the automated process is restarted at a beginning of the automated process, at a beginning of the first sub-process, at the step of the process during which the event occurred, at a second sub-process. In another embodiment, the method includes detecting the event during one of a plurality of consecutive sub-processes, skipping at least one subsequent sub-process, and restarting the automated process at a second sub-process of the consecutive sub-process, wherein the second sub-process occurs after the at least one skipped sub-process. In one embodiment, the method also includes defining the execution model using a process template and defining each sub-process using elements of the process template.

Accordingly, the above-described system and method facilitate providing a formalized manufacturing process definition model that is enforced by process design software and leveraged by a process execution engine to operate an automated system. The structure of the model simplifies process design issues including, but not limited to, initialization/shutdown, process recovery, re-work/canceling of process steps, and/or re-use of logic between processes.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for operating an automated system are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method for operating an automated manufacturing process that includes a plurality of sub-processes, said method comprising:
    defining an execution model as a process template applicable to the automated manufacturing process, the execution model including at least an unload procedure, a pre-process procedure, and a pre-sub-process procedure;
    detecting an event during a first sub-process of the plurality of sub-processes;
    resetting the first sub-process by operating the unload procedure;
    operating at least one of the pre-process procedure and the pre-sub-process procedure; and
    based on the at least one of the pre-process procedure and the pre-sub-process procedure, continuing the automated manufacturing process at a predetermined step of the automated manufacturing process.

2. A method in accordance with claim 1 wherein continuing the automated manufacturing process at a predetermined step of the process further comprises restarting the automated manufacturing process at a beginning of the automated manufacturing process.

3. A method in accordance with claim 1 wherein continuing the automated manufacturing process at a predetermined step of the automated manufacturing process further comprises restarting the automated manufacturing process at a beginning of the first sub-process.

4. A method in accordance with claim 1 wherein continuing the automated manufacturing process at a predetermined step of the automated manufacturing process further comprises restarting the automated manufacturing process at the step of the process during which the event occurred.

5. A method in accordance with claim 1 wherein continuing the automated manufacturing process at a predetermined step of the automated manufacturing process further comprises restarting the automated manufacturing process at a second sub-process of the plurality of sub-processes.

6. A method in accordance with claim 1 wherein:
    detecting the event during a first sub-process further comprises detecting the event during one of a plurality of consecutive sub-processes; and
    continuing the automated manufacturing process at a predetermined step of the automated manufacturing process further comprises skipping at least one subsequent sub-process and restarting the automated manufacturing process at a second sub-process of the consecutive sub-process, wherein the second sub-process occurs after the at least one skipped sub-process.

7. A method in accordance with claim 1 further comprising defining each sub-process using elements of the process template.

8. An automated system comprising:
    automated equipment; and
    a processor configured to operate the automated equipment by:
        defining an execution model as a process template applicable to the automated manufacturing process, the execution model including at least an unload procedure, a pre-process procedure, and a pre-sub-process procedure.

operating an automated manufacturing process that includes a plurality of sub-processes;

detecting an event during a first sub-process of the plurality of sub-processes;

resetting the first sub-process by operating the unload procedure;

operating at least one of the pre-process procedure and the pre-sub-process procedure; and based on the at least one of the pre-process procedure and the pre-sub-process procedure, continuing the automated manufacturing process at a predetermined step of the automated manufacturing process.

9. An automated system in accordance with claim 8 wherein the processor is further configured to restart the automated manufacturing process at a beginning of the automated manufacturing process.

10. An automated system in accordance with claim 8 wherein the processor is further configured to restart the automated manufacturing process at a beginning of the first sub-process.

11. An automated system in accordance with claim 8 wherein the processor is further configured to restart the automated manufacturing process at the step of the process during which the event occurred.

12. An automated system in accordance with claim 8 wherein the processor is further configured to restart the automated manufacturing process at a second sub-process of the plurality of sub-processes.

13. An automated system in accordance with claim 8 wherein the processor is further configured to:

detect the event during one of a plurality of consecutive sub-processes;

skip at least one subsequent sub-process; and restart the automated manufacturing process at a second sub-process of the consecutive sub-process, wherein the second sub-process occurs after the at least one skipped sub-process.

14. An automated system in accordance with claim 8 wherein the processor is further configured to define each sub-process using elements of the process template.

15. A computer program embodied on a computer-readable medium, said computer program comprising at least one code segment configured to instruct a computer to:

define an execution model using a process template that is applicable to at least one of a plurality of automated manufacturing processes, the execution model including at least an unload procedure, a pre-process procedure, and a pre-sub-process procedure;

define each of a plurality of sub-processes of the at least one of the plurality of automated manufacturing processes using elements of the process template;

operate the at least one of the plurality of automated manufacturing processes, wherein the at least one of the plurality of automated manufacturing processes includes the plurality of sub-processes;

detect an event during a first sub-process of the plurality of sub-processes;

reset the first sub-process by operating the unload procedure;

operate at least one of the pre-process procedure and the pre-sub-process procedure; and based on the at least one of the pre-process procedure and the pre-sub-process procedure, continue the at least one of the plurality of automated manufacturing processes at a predetermined step of the at least one of the plurality of automated manufacturing processes.

16. A computer program in accordance with claim 15 wherein said computer program comprises at least one code segment configured to restart the at least one of the plurality of automated manufacturing processes at a beginning of the automated manufacturing process.

17. A computer program in accordance with claim 15 wherein said computer program comprises at least one code segment configured to restart the at least one of the plurality of automated manufacturing processes at a beginning of the first sub-process.

18. A computer program in accordance with claim 15 wherein said computer program comprises at least one code segment configured to restart the at least one of the plurality of automated manufacturing processes at a step of the first sub-process during which the event occurred.

19. A computer program in accordance with claim 15 wherein said computer program comprises at least one code segment configured to restart the at least one of the plurality of automated manufacturing processes at a second sub-process of the plurality of sub-processes.

20. A computer program in accordance with claim 15 wherein said computer program comprises at least one code segment configured to:

detect the event during one of a plurality of consecutive sub-processes;

skip at least one subsequent sub-process; and restart the at least one of the plurality of automated manufacturing processes at a second sub-process of the consecutive sub-processes, wherein the second sub-process occurs after the at least one skipped sub-process.

* * * * *

UNITED STATES PATENT AND TRADEMARK OFFICE
CERTIFICATE OF CORRECTION

| | | |
|---|---|---|
| PATENT NO. | : 7,822,492 B2 | Page 1 of 3 |
| APPLICATION NO. | : 11/875236 | |
| DATED | : October 26, 2010 | |
| INVENTOR(S) | : De Benedetto et al. | |

It is certified that error appears in the above-identified patent and that said Letters Patent is hereby corrected as shown below:

The title page showing the illustrative figure should be deleted to be replaced with the attached title page.

The drawing sheet, consisting of Fig. 2, should be deleted to be replaced with the drawing sheet, consisting of Fig. 2, as shown on the attached pages.

In Column 7, Line 3, in Claim 8, delete "procedure." and insert -- procedure; --, therefor.

Signed and Sealed this
Ninth Day of August, 2011

David J. Kappos
*Director of the United States Patent and Trademark Office*

(12) United States Patent
De Benedetto et al.

(10) Patent No.: US 7,822,492 B2
(45) Date of Patent: Oct. 26, 2010

(54) METHODS AND SYSTEMS FOR OPERATING AN AUTOMATED SYSTEM USING A PROCESS DEFINITION MODEL

(75) Inventors: David De Benedetto, Edmonton (CA); Ryan Berry, Edmonton (CA); Javan Gargus, Edmonton (CA); Gregory Millinger, Port Clinton, OH (US)

(73) Assignee: GE Intelligent Platforms, Charlottesville, VA (US)

( * ) Notice: Subject to any disclaimer, the term of this patent is extended or adjusted under 35 U.S.C. 154(b) by 472 days.

(21) Appl. No.: 11/875,236

(22) Filed: Oct. 19, 2007

(65) Prior Publication Data
US 2009/0105851 A1 Apr. 23, 2009

(51) Int. Cl.
G06F 19/00 (2006.01)
(52) U.S. Cl. .............. 700/29; 700/23; 700/27; 700/89
(58) Field of Classification Search ............... 700/29, 700/23, 27
See application file for complete search history.

(56) References Cited

U.S. PATENT DOCUMENTS

| | | | |
|---|---|---|---|
| 3,828,321 A | 8/1974 | Wilber et al. | |
| 4,377,000 A | 3/1983 | Staab | |
| 4,654,821 A | 3/1987 | Lapp | |
| 4,912,708 A | 3/1990 | Wendt | |
| 5,580,366 A | 12/1996 | Farkas et al. | |
| 5,655,083 A | 8/1997 | Bagley | |
| RE37,038 E | 1/2001 | Eastridge et al. | |
| 6,339,832 B1 * | 1/2002 | Bowman-Amuah | 714/35 |
| 6,351,824 B1 | 2/2002 | Singh | |
| 6,356,806 B1 | 3/2002 | Grob et al. | |
| 6,434,628 B1 * | 8/2002 | Bowman-Amuah | 714/48 |
| 6,449,618 B1 * | 9/2002 | Blott et al. | 1/1 |
| 6,496,831 B1 * | 12/2002 | Baulier et al. | 1/1 |
| 6,496,850 B1 * | 12/2002 | Bowman-Amuah | 709/203 |
| 6,502,133 B1 * | 12/2002 | Baulier et al. | 709/224 |
| 6,681,230 B1 * | 1/2004 | Blott et al. | 1/1 |

(Continued)

FOREIGN PATENT DOCUMENTS

EP 1672451 A 6/2006

(Continued)

OTHER PUBLICATIONS

"Flexible Exception Handling in the OPERA Process Support System", Hagen et al, Swiss Federal Institute of Technology (ETH), 1998.*

(Continued)

Primary Examiner—Michael D Masinick
(74) Attorney, Agent, or Firm—Global Patent Operation; Mark A. Conklin (57) ABSTRACT

A method is provided for operating an automated process defined by an execution model. The automated process includes a plurality of sub-processes. The method includes detecting an event during a first sub-process of the plurality of sub-processes, and resetting the first sub-process by operating an unload procedure that is written into the execution model. The method also includes operating at least one of a pre-process and a pre-sub-process procedure to facilitate continuing the automated process at a predetermined step of the automated process. The pre-process and the pre-sub-process procedures are written into the execution model.

20 Claims, 2 Drawing Sheets

FIG. 2